(12) United States Patent
Wirth

(10) Patent No.: US 11,217,127 B2
(45) Date of Patent: Jan. 4, 2022

(54) FOAM FINGER

(71) Applicant: Eva Wirth, Essen (DE)

(72) Inventor: Eva Wirth, Essen (DE)

( * ) Notice: Subject to any disclaimer, the term of this patent is extended or adjusted under 35 U.S.C. 154(b) by 0 days.

(21) Appl. No.: 16/512,420

(22) Filed: Jul. 16, 2019

(65) Prior Publication Data

US 2020/0098292 A1 Mar. 26, 2020

(30) Foreign Application Priority Data

Sep. 26, 2018 (DE) .......................... 202018004445.8
Jan. 25, 2019 (DE) .......................... 202019100439.8

(51) Int. Cl.
| | | |
|---|---|---|
| *G09F 21/02* | (2006.01) | |
| *G02B 30/27* | (2020.01) | |
| *B44F 7/00* | (2006.01) | |
| *E04F 13/08* | (2006.01) | |
| *G09F 19/14* | (2006.01) | |
| *C09J 7/38* | (2018.01) | |
| *C09J 7/30* | (2018.01) | |

(52) U.S. Cl.
CPC .............. *G09F 21/026* (2013.01); *B44F 7/00* (2013.01); *C09J 7/30* (2018.01); *C09J 7/38* (2018.01); *E04F 13/0885* (2013.01); *G02B 30/27* (2020.01); *G09F 19/14* (2013.01); *Y10T 428/14* (2015.01); *Y10T 428/1486* (2015.01)

(58) Field of Classification Search
CPC ........ G09F 21/026; G09F 19/14; G09F 21/02; G09F 21/023; C09J 7/38; C09J 7/30; E04F 13/0885; G02B 30/27; B44F 1/10; B44F 7/00; Y10T 428/14; Y10T 428/1486; A47C 3/16; A47C 27/002; A41D 19/0051; A63H 33/30; A63H 37/00; H04N 13/305; B41M 3/18; B44C 1/105; B44C 3/02; D21H 27/20
See application file for complete search history.

(56) References Cited

U.S. PATENT DOCUMENTS

| | | | |
|---|---|---|---|
| 2,884,644 A | | 5/1959 | Jefferson |
| 4,455,963 A | * | 6/1984 | Matsuo ................... A61F 2/583 116/200 |
| 5,432,991 A | * | 7/1995 | Godleski .................. A63H 3/14 116/306 |
| 5,695,346 A | | 12/1997 | Sekiguchi |
| 6,258,194 B1 | | 7/2001 | Danon |

(Continued)

FOREIGN PATENT DOCUMENTS

| | | |
|---|---|---|
| DE | 202004019493 U1 | 2/2005 |
| EP | 2682933 A1 | 1/2014 |

(Continued)

OTHER PUBLICATIONS

Amazon, Jul. 2, 2010, "Disney Cars 3D and Lenticular Stickers", Disney, [online], available from https://www.amazon.co.uk/Disney-Cars-3D-Lenticular-Stickers/dp/B00VVWE2C/ref=sr_1_19?keywords=lenticular+sticker&qid=1574959129&mid=1642204031&s=toys&sr=1-19 [Accessed Mar. 15, 2021].

*Primary Examiner* — Cassandra Davis
(74) *Attorney, Agent, or Firm* — Smartpat PLC

(57) ABSTRACT

A foam finger, in particular as a palm enlargement, advertising space or to be carried during sports events, that is comprised of at least two side faces connected to each other. At least a portion of a side face comprises a printed lenticular foil and/or a lenticular foil with images stuck behind it.

7 Claims, 2 Drawing Sheets

(56) References Cited

U.S. PATENT DOCUMENTS

| | | | | |
|---|---|---|---|---|
| 6,612,056 | B1* | 9/2003 | Thomas, II | G09F 21/02 |
| | | | | 40/586 |
| 7,001,654 | B2* | 2/2006 | Kiraly | B32B 7/06 |
| | | | | 283/72 |
| D558,273 | S* | 12/2007 | Keith | D20/33 |
| 7,480,100 | B1* | 1/2009 | Raymond | G02B 27/06 |
| | | | | 359/626 |
| 7,530,876 | B1* | 5/2009 | Wimberly | A63H 5/00 |
| | | | | 2/158 |
| D692,495 | S* | 10/2013 | Bengyak | D20/33 |
| D709,955 | S* | 7/2014 | Bengyak | D20/29 |
| D770,566 | S* | 11/2016 | Harris | D20/33 |
| 2006/0250695 | A1 | 11/2006 | Welch | |
| 2006/0278109 | A1* | 12/2006 | Johnson | B41F 16/02 |
| | | | | 101/415.1 |
| 2011/0072698 | A1* | 3/2011 | Sample | G09F 21/02 |
| | | | | 40/586 |
| 2013/0118045 | A1* | 5/2013 | Sample | G09F 21/02 |
| | | | | 40/538 |
| 2015/0143728 | A1 | 5/2015 | Søndergard et al. | |
| 2016/0327708 | A1 | 11/2016 | Liles et al. | |
| 2017/0347725 | A1 | 12/2017 | Mills | |

FOREIGN PATENT DOCUMENTS

| | | |
|---|---|---|
| JP | 2012047015 A | 3/2012 |
| KR | 20130010295 A | 1/2013 |
| KR | 20140100723 A | 8/2014 |
| WO | 2017210297 A1 | 12/2017 |

* cited by examiner

FOAM FINGER

CROSS REFERENCE TO RELATED APPLICATIONS

This application claims the priority of DE 202018004445.8 filed on 2018 Sep. 26 and the priority of DE 202019100439.8 filed on 2019 Jan. 25; all applications are incorporated by reference herein in their entirety.

BACKGROUND

The invention relates to a foam finger, in particular as a palm enlargement, advertising space or to be carried during sports events, comprising at least two side faces which are connected to each other.

Foam fingers have been known for many years and consist of foam or similar materials, for example with a raised forefinger. The foam finger may here be carried in the hand or on the arm. Foam fingers are popular in particular during sports events to express the affinity to a sports team or, for example, to a candidate in politics. The foam fingers originally come from the USA where they have been used for many years in sports stadiums and at pre-election parties. The foam finger was invented in 1978 by General Fausst, an American High School teacher. The foam finger quickly came to success after Fausst had sold it for the first time at the Cotton Bowl final in 1978. The known foam fingers have a simple print which is adapted corresponding to the occasion, the sports event or an advertising measure. Still today, the foam fingers are employed for sports events and provided with a print.

SUMMARY

The invention relates to a foam finger, in particular as a palm enlargement, advertising space or to be carried during sports events, that is comprised of at least two side faces connected to each other. At least a portion of a side face comprises a printed lenticular foil and/or a lenticular foil with images stuck behind it.

DETAILED DESCRIPTION

To increase the advertising effectiveness, the object underlying the present invention is to provide a foam finger that meets a particular optical demand and may be manufactured inexpensively.

To achieve the object, according to the invention, at least a portion of a side face comprises a printed lenticular foil and/or a lenticular foil behind which images are stuck. Further advantageous developments can be taken from the subclaims.

By using a lenticular foil which may be fixed at least on one side, and there moreover only in a partial area of a side face, apart from the impressing size of such a foam finger, different images are obtained from various angles of view evoking the viewers' increased attention. The optical effects achievable with the lenticular foil consist, for example, of 3D effects, a depth image of pictures, the representation of flip images or changing images through to the depiction of smooth animations. Here, combinations of the mentioned effects are, of course, also possible. For the generation of a 3D effect, for example, pictures are made in individual depth levels, just as with a scenery theatre, and from this, a three-dimensional image is created which is arranged behind the lenticular foil. For changing images or for animations, in contrast, two or more starting images are separated into narrow strips which are alternatingly attached one next to the other on the back side of the lenticular foil. Here, the images produced with special software are usually disposed on the back side of the lenticular foil. Here, the back side of the lenticular foil corresponds to the side which is facing away from the optically structured foil side, i. e. the foil side provided with lenses. The complexity of the optical effects is increased with the number of images taken as a basis for the image information and which are printed or stuck at the back side of the lenticular foil. For example, for two-phase flip images, the combination of two images is already sufficient. By processing several images, multi-phases or complete motion sequences, but also zooming or morphing effects may be represented. The representations are here set up from a plurality of single images, just as with a flip book, which essentially merge into each other smoothly. Here, preferably a fourfold animation with four images is used. By designing a lenticular foil with printed images and/or images stuck at the back on the foam fingers, these are particularly optically enhanced thus attracting the attention of the viewers in any case. With such a foam finger, the carrier may thus express that on the one hand, he can attract attention by the provided palm enlargement, but the foam finger could equally be provided with an advertising space to suggest a certain product in this manner. Preferably, the foam fingers in the inventive form are used for carrying them during sports events so that the carrier may suggest his favourite club or his favourite team, optionally also a favourite player, by corresponding images. The variation of the images located behind the lenticular foil is here arbitrary and may be adapted corresponding to purpose, for example during normal Bundesliga games for a Bundesliga club, but equally during European championships or World championships. It is also possible to employ the foam finger during other sports events, such as during ski races or athletic sports, to render homage to a particularly adored athlete in this manner.

In one aspect of the invention, at least one side face of the foam finger consists of a lenticular foil, or such a foil is fixed to the side face. The side faces may be connected to each other by a material bond and/or with a form-fit, wherein the two side faces may be directly glued, sewn or optionally welded to each other.

As an alternative, it is possible that the two side faces are bordered with an edge strip, wherein the edge strip may hold the two side faces at a defined distance and thus a three-dimensional shape for the foam finger is formed. The edge strips may here have a width of 2 to 5 cm so that the side faces are arranged at such a distance with respect to each other that sufficient stability is ensured, a foam filling being provided between the side faces. Due to the use of a foam material, it is ensured that the foam finger only has a low weight and may be easily held by a carrier even for an extended period. By the use of the edge strips and a defined distance of the two side faces, here a preferably three-dimensional shape of the foam finger is achieved.

In a further development of the invention, the lenticular foil with the images at its back is laminated with a paper fibre and/or a fabric-like supporting layer at its back. The supporting layer serves to protect the image information applied to the back side of the lenticular foil from damages. By the image information applied on the back side of the lenticular foil and by the protective layer, a sandwich structure is formed which is protected from external damages, such as scratches, wherein the supporting layer increases the dimensional stability of the lenticular foil. It is easily possible that the supporting layer is designed to be larger than the size of the lenticular foil and projecting sections which are used as edge sections for the connection with the side faces.

In a further development, it is possible that the edges of the lenticular foil with the images on the back are bordered. By bordering, the lenticular foil receives, over the complete surface of the foam finger, a clear reinforcement and increase with respect to dimensional stability. Here, the bordered edge of the lenticular foil may come to rest in the connection area of the side faces or a circumferential edge strip and is thus not visible for the viewer.

As an alternative, it is possible that the lenticular foil is glued, ironed, sewn or welded on the side faces. This type of manufacture of the foam finger may be effected inexpensively and nevertheless guarantees sufficient adhesion on the side faces, even for the case where the foam finger is subjected to increased stresses.

In a further development of the invention, the foam finger has a handle or an opening for a hand. By a handle or, even better, by an opening in the foam finger, which is preferably embodied like a full-fingered glove, it is possible to insert a hand so that the foam finger may be securely held with the complete palm and the fingers. Preferably, the foam finger is embodied to be soft but dimensionally stable, injuries of non-involved third persons, in particular adjacent visitors, are thus prevented. In order not to put excessive strain on the carrier by the weight of the foam finger, the latter preferably has an extremely low weight.

In a further development of the invention, the foam finger has the shape of a palm with "the finger", an extended thumb or a Vulcans' hand signal. The mentioned shapes of the foam finger only represent exemplary designs and may be replaced by any number of other designs, for example also by a clenched fist or by the shape of a club symbol or a club emblem. The possibilities are multifarious and may be adapted to the respective purpose.

The particularity of the present invention is that a foam finger known per se undergoes an optical enhancement by at least a partial area of a side face being covered with a lenticular foil. It is of course possible that the complete area is covered with a lenticular foil, or optionally both side faces are covered. The shape of the foam finger may here be chosen arbitrarily, just as the type of lenticular foil with the images behind it which may be designed to be both two- and three-dimensional and be used, for example, for honouring famous athletes, clubs, or else for encouraging individual athletes or teams during tournaments. It is moreover possible to use the foam finger for advertising spaces, for example to suggest a certain product during an event.

BRIEF DESCRIPTION OF THE DRAWINGS

The invention will be further illustrated again below with reference to the figures.

In the drawings.

DETAILED DESCRIPTION OF THE PREFERRED EMBODIMENTS

Figure 1:
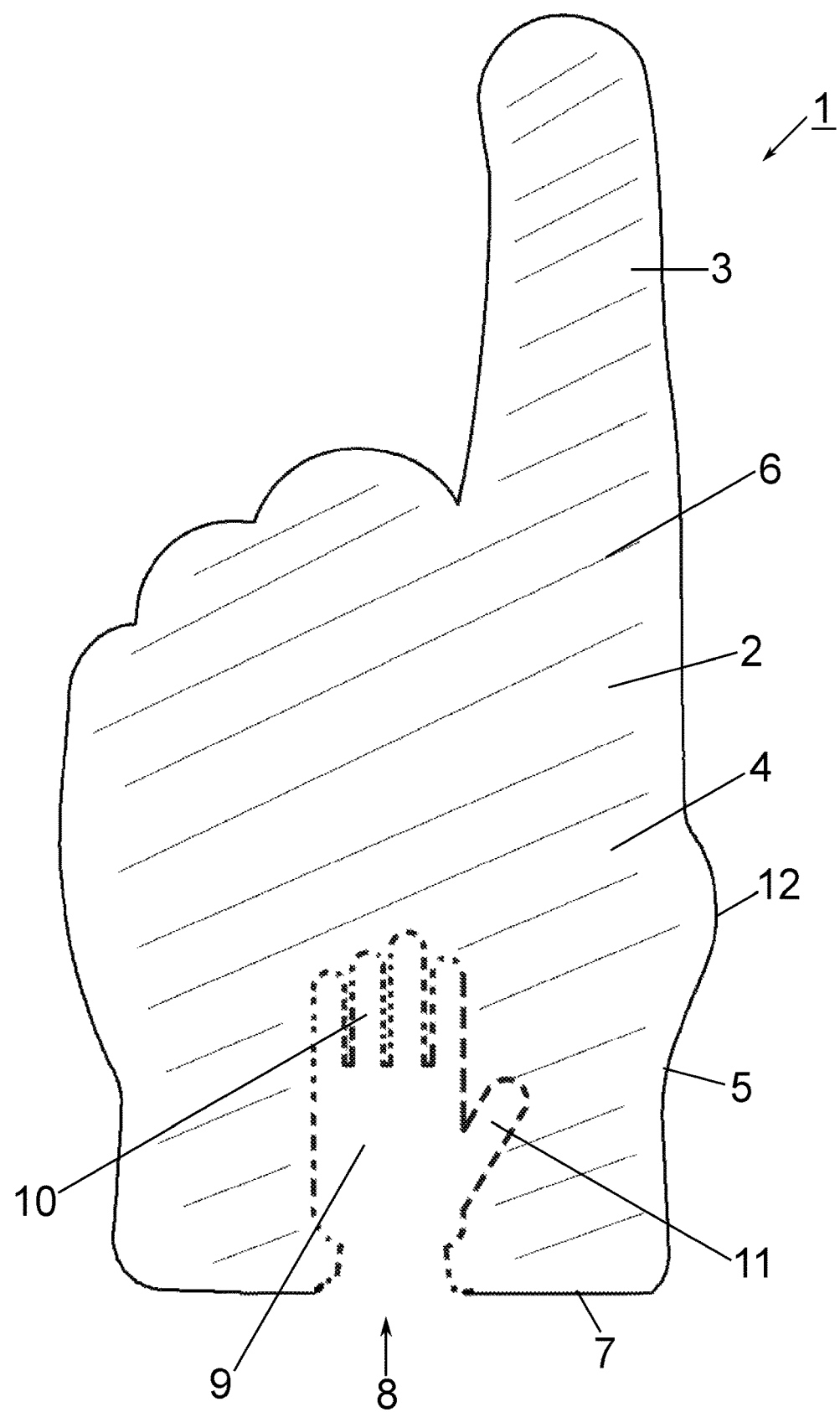
FIG. 1 shows, in a side view, a foam finger with an outstretched forefinger.

FIG. 1 shows, in a side view, a first embodiment of a foam finger 1 having the form of a palm 2 with an outstretched forefinger. On the front side face 4 and optionally on the rear side face 5, a lenticular foil 6 is attached which may be, for example, glued on, sewn on or welded on. At the lower edge 7, an opening 8 is formed into which a hand may be inserted, wherein the opening 8 has the form of a palm 9 with fingers 10 and a thumb 11. If a hand is inserted into the opening 8, the foam finger 1 may be securely held by the outstretched fingers 10 and the outstretched thumb 11, wherein due to the low weight, the carrier will not weaken and the foam finger 1 may also be rotated or swayed in various directions.

Figure 2:
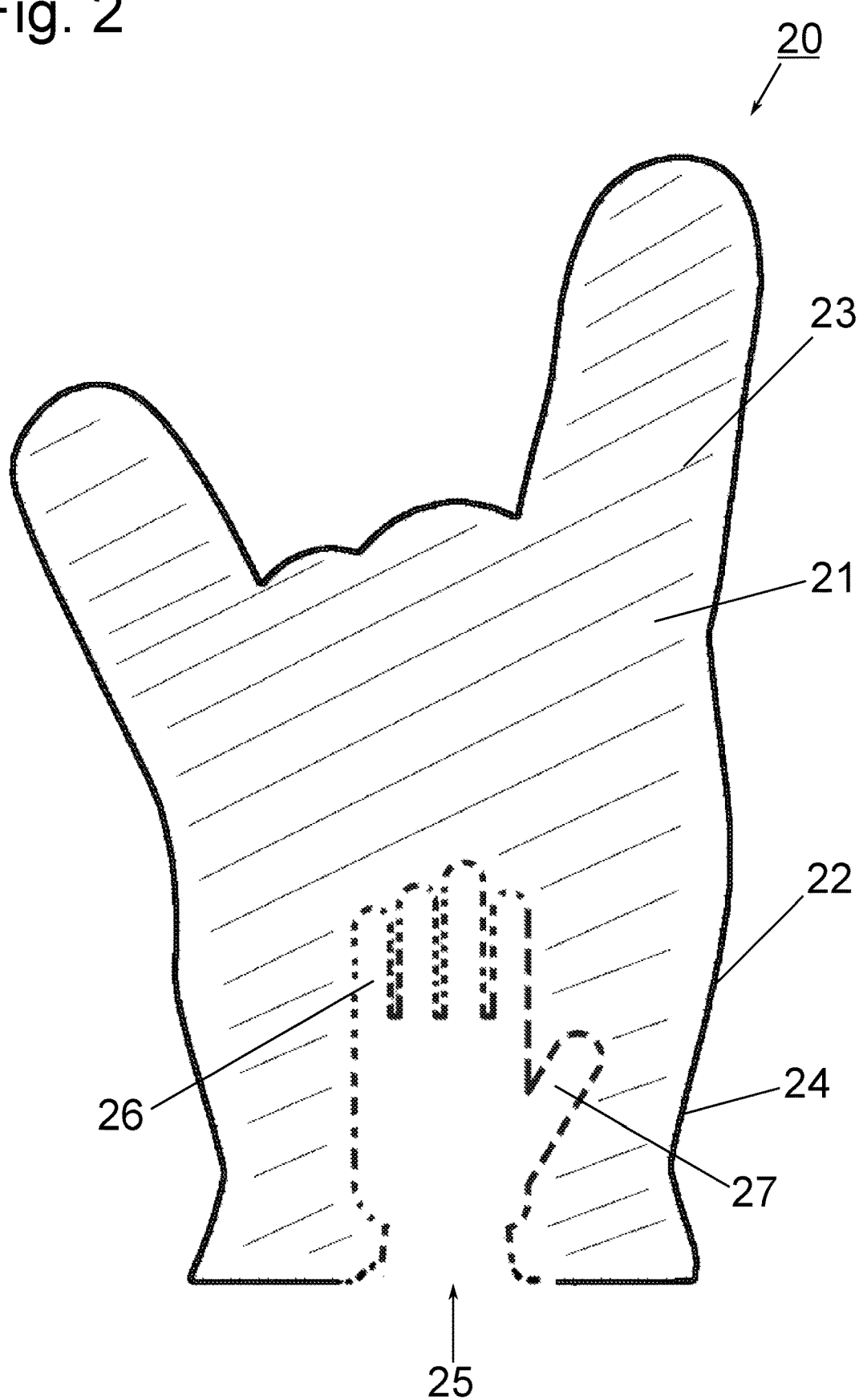
FIG. 2 shows a foam finger with an outstretched forefinger and little finger.

FIG. 2 shows, in a side view, a second foam finger 20 which has a front side face 21 and a rear side face 22. Both the front and the rear side faces 21, 22 may in this case be covered with a lenticular foil 23. The lenticular foil 23 may be formed down to the circumferential edge 24, but it is also possible that it only covers a partial area of the side face 21 or 22. It is moreover possible, just as in the first variant of the embodiment, that the circumferential edge 24 is formed by an edge strip so that between the two side faces 21, 22, a foam may be inserted which in turn takes care that the weight of the foam finger 20 is extremely low and does not put a strain on the carrier. This embodiment, too, has an opening 25 into which a hand may be inserted, the opening being enlarged to individual fingers 26 and a thumb 27, so that a hand with outstretched fingers 26 and an outstretched thumb 27 may be inserted into the foam finger 20.

The shown variants of the embodiment represent examples of how a foam finger 1 or 20 may be designed. Designs departing from this are easily possible, wherein the side faces are predominantly at least partially covered with a lenticular foil which is glued on, sewn on or welded on.

LIST OF REFERENCE NUMERALS 1 foam finger
2 palm
4 side face
5 side face
6 lenticular foil
7 edge
8 opening
9 palm
10 finger
11 thumb
20 foam finger
21 side face
22 side face
23 lenticular foil
24 edge
25 opening
26 finger
27 thumb

The invention claimed is:

1. A foam finger (1, 20), in the form of a palm enlargement, advertising space or to be carried during sports events, comprising:
   two flat side faces (4, 5, 21, 22) connected to each other, the two side faces (4, 5, 21, 22) being connected to one another in a firmly bonded or positively interlocking way;
   an edge strip that extends along a circumference of the two side faces and holds the two side faces (4, 5, 21, 22) at a defined distance of 2 to 5 cm from one another, whereby a dimensionally stable three-dimensional shape is produced,
   a foam filling arranged between the two side faces (4, 5, 21, 22);
   a palm cavity formed in the foam filling;

four finger cavities formed in the foam filling extending generally parallel to one another from the palm cavity;

a thumb cavity formed in the foam filling extending from the palm cavity at an angle relative to the four finger cavities; and an opening (8, 25) for a hand providing exterior access to the palm cavity, wherein at least one of the two side faces (4, 5, 21, 22) consists of a lenticular foil (6, 23) that covers the at least one of the side faces completely, and wherein edges of the lenticular foil (6, 23) are bordered to reinforce the dimensional stability of the foam finger.

2. The foam finger (1, 20) according to claim 1, wherein the lenticular foil (6, 23) comprises images arranged behind said lenticular foil, and wherein a back of the lenticular foil (6, 23) is laminated with a paper fiber or fabric supporting layer.

3. The foam finger (1, 20) according to one of claim 1, wherein the lenticular foil (6, 23) is glued, ironed, sewn or welded on the one of the two side faces (4, 5, 21, 22).

4. The foam finger (1, 20) according to claim 1, wherein the foam finger (1, 20) is soft.

5. The foam finger (1, 20) according to claim 1, wherein the foam finger (1, 20) has a low weight.

6. The foam finger (1, 20) according to claim 1, wherein the foam finger (1, 20) has the shape of a hand with "the finger", an outstretched thumb (11, 27) or a Vulcans' salutation.

7. The foam finger (1, 20) according to claim 1, wherein the foam finger (1, 20) has the form of a club symbol or a club emblem.

\* \* \* \* \*